United States Patent [19]

Sugisawa et al.

[11] Patent Number: 4,585,665

[45] Date of Patent: Apr. 29, 1986

[54] PROCESS FOR PREPARING PRESSED TOFU

[75] Inventors: Ko Sugisawa; Yasushi Matsumura; Kazumitsu Taga; Kouji Sengoku; Yoshiaki Nagatome, all of Higashiosaka, Japan

[73] Assignee: House Food Industrial Co., Ltd., Osaka, Japan

[21] Appl. No.: 662,188

[22] Filed: Oct. 18, 1984

[30] Foreign Application Priority Data

Oct. 20, 1983 [JP] Japan ............................ 58-196804
Oct. 20, 1983 [JP] Japan ............................ 58-196805

[51] Int. Cl.$^4$ ............................ A23J 3/00; A23L 1/20
[52] U.S. Cl. ............................ 426/634; 426/656
[58] Field of Search ............................ 426/634, 656

[56] References Cited

U.S. PATENT DOCUMENTS 4,140,811 2/1979 Ogasa et al. ............................ 426/634
4,147,811 4/1979 Abe ............................ 426/634

Primary Examiner—Robert Yoncoskie
Attorney, Agent, or Firm—Harry M. Weiss & Associates

[57] ABSTRACT

An improved process for preparing pressed tofu is provided, the improvement comprising the two steps of;
(1) subjecting tofu curd to a dividing operation with syneresis which water of 4 to 46% by the weight of water included in the curd is removed by, and;
(2) Pressing the divided curd by gradually increasing the pressure from an initial pressure of 0.04–0.6 kg/cm$^2$ to a final pressure of 0.8–3.2 kg/cm$^2$ to reduce the water content to at most 80%. The pressed tofu thus prepared is of compact texture, having good springiness, good taste and excellent long term storability.

13 Claims, No Drawings

PROCESS FOR PREPARING PRESSED TOFU

BACKGROUND OF THE INVENTION

The present invention relates to a process for preparing pressed tofu. More particularly, the present invention relates to an industrially favorable process for preparing pressed tofu having a compact texture, springiness, long term storability and good taste.

Pressed tofu is also referred to as "kan tofu" or "tofu-kan" in China. Pressed tofu is suitable as an ingredient for various pan fried foods due to its shape retention property and it may be widely used in a wide variety of cooked foods due to its superior processing characteristics. In addition, its palatability fits in with modern tastes and even in Japan the demand for it, therefore, is becoming greater and greater.

However, since demand for pressed tofu has been very low, heretofore, the scale of its production has been small and very close to manual preparation. Therefore, no process for preparing pressed tofu of high quality, which is industrially favorable or suitable for bulk production, has been established.

The conventional processes require a extremely prolonged compression process and further it is necessary to add a great amount of common salt to the tofu for the purpose of making it harder and this merely results in the reduction of the processing characteristics of the pressed tofu. In the conventional processes, the storability of the finished product has been left out of consideration.

SUMMARY OF THE INVENTION

Under such circumstances, the inventors have conducted exhaustive studies toward the development of an industrially favorable method for preparing pressed tofu of high quality and found that it is quite effective to subject curd prepared from soybean milk or a solution of isolated soybean protein to a process for dividing, which is accompanied by syneresis before compressing the curd and optionally to heat it, in order to prepare pressed tofu of high quality with high productivity and thus the present invention was accomplished.

The principal object of this invention is to provide a new industrially favorable process for preparing pressed tofu.

Other objects of this invention are to provide pressed tofu having compact texture, good springiness and good taste, and to provide new pressed tofu having excellent long term storability.

These and other objects of this invention are accomplished by the process comprising:

(i) subjecting curd prepared by adding a coagulant to soybean milk or an agueous solution of isolated soybean protein to a step for dividing treatment that is acompanied by syneresis and carried out so that the amount of water removed from the curd due to syneresis falls within a range of 4 to 46% by weight of water included in the curd, and (ii) a step for pressing the divided curd to make the water content thereof not more than 80%.

Between, the two steps, the step (i) is quite effective to improve the dehydration efficiency of the subsequent pressing step (ii), that is to carry out the step (ii) with effect in a short period of time.

Further, the other objects of this invention are accomplished by the process comprising said steps (i), (ii) and additional step (iii) is as shown below:

(iii) a step for charging the pressed curd into a container and sealing the container to subject it to heat treatment.

The heating step (iii) is also an important for the reason that the process enables compact texture to be imparted to the product by the reintegration of tofu texture which is once divided during the step (i) and to impart moderate springiness to the finished product and to improve the taste thereof.

DETAILED EXPLANATION OF THE INVENTION

The process according to the present invention will now be described in more detail.

In the process of this invention, soybean milk or an aqueous solution of isolated soybean protein is used as a starting material. The soybean milk may be prepared by a conventional process which comprises, for example, using whole soybean, dehulled soybean or defatted soybean as an ingredient and treating it according to the following series of processes: (ingredient)→immersion in water→addition of water→grinding (to form slurry i.e., "GO") heating→isolation of lees of soybean (i.e., "OKARA")→(soybean milk). If desired, the heating process may be omitted and the "GO" (which is a mushy ground of the fresh soybean swollen with water) directly subjected to the separation process to form soybean milk. However, it is desirable in the invention to apply heat treatment to the "GO", such as boiling, for about 30 seconds to 10 minutes at a temperature of about 80° to 100° C.

Such heating is quite desirable for the reason that the heat treatment causes a moderate modification of the soybean protein whereby the water retention of the final tofu can be enhanced and the tofu becomes agreeable to the palate.

It is possible in the process of this invention to use the socalled powdered soybean milk obtained by powdering or granulating the soybean milk prepared according to the process, such as described, by using a spray-drying technique or the like. In this case, the powdered soybean milk is preferably used in the form of dispersion or solution prepared by dispersing and dissolving it into non-heated water or hot water.

The aqueous solution of the isolated soybean protein as used herein can be obtained by adding a precipitant to the soybean milk prepared according to a conventional method to precipitate soybean protein and then redispersing and redissolving the precipitate in water.

A coagulant is then added to the soybean milk or the aqueous solution of the isolated soybean protein thus obtained to form curd.

The concentration of solids in the soybean milk or the aqueous solution of the separated soybean protein used in the process of the invention is not critical and can be adjusted by controlling the amount of water added at each process step in preparing the same depending on the amount and the kind of the coaqulant used. The concentration of solids of the soybean milk is preferably in the range of from 8 to 20%, preferably 10 to 18% by weight of the total soybean milk used and good results is expected.

As the coagulant, there may be mentioned, for example any of the well-known coagulants for tofu such as δ-gluconic lactones (hereunder referred to as G.D.L.)

and divalent metal salts such as calcium sulfate. These coagulants may be used singly or in combination.

The coagulant is used according to a conventional method. For example, it may be used by directly mixing it with soybean milk or a solution of separated soybean protein or it may also be used in the form of a previously formed aqueous solution.

The G.D.L. is preferably used in an amount of 0.30 to 0.65%, preferably 0.4 to 0.6% whereby good curd is obtained.

On the other hand, if calcium sulfate is used as the coagulant it is preferably used in an amount of 0.25 to 0.65%, preferably 0.3 to 0.5% for curd to have hardness suitable for the subsequent compression treatment.

According to the invention, the curd may be prepared by adding a coagulant to soybean milk or an aqueous solution of isolated soybean protein and leaving the mixture as it is for about 5 to 60 minutes.

The curd thus obtained is then subjected to a process for dividing it into pieces which is accompanied by syneresis. By syneresis, the 4 to 46% by the total weight of water included in the curd is removed at this step (hereunder referred to as the amount of water removed).

The term "the amount of water removed" as used herein is defined as the amount of water removed from the curd when the divided curd is maintained on a 120-mesh sieve (opening 125 micron) for 15 minutes.

The step for dividing the curd is carried out to make the exudation of water contained in the curd easier. That is the step is applied to improve the dehydration efficiency in the subsequent pressing step and to minimize the time required for this step and as a result, it enables pressed tofu having compact texture, proper springiness and good taste to be obtained.

If the dividing step is omitted or the amount of water removed is less than 4%, the exudation of water in the curd is difficult during the pressing operation whereby a pressing operation over a long period of time is necessary and the production efficiency is also reduced. If the pressing operation is carried out under an elevated pressure without use of the process for dividing for the purpose of the reduction of the required time for this operation, the texture of the tofu is considerably disrupted and it is impossible to obtain the desired pressed tofu having compact texture.

On the other hand, if the amount of water removed is more than 46%, pressed tofu having a good taste cannot be obtained and the finished tofu lacks that compactness and springiness which are regarded as the life and the soul of good tofu and it is not agreeable to the palate.

Therefore, in an embodiment of this invention the amount of water removed during the dividing step is critical and it should fall within the range mentioned above. It is possible to obtain pressed tofu with excellent compactness of texture and springiness if the amount of water removed falls within the range of 9 to 32%.

The dividing process as used herein may be any means capable of physically dividing curd.

As such means, there may be mentioned, for example:
(a) cutting treatment in which the curd is cut by a cutter or the like in any form such as dice (or cubes), or any irregular form;
(b) crushing treatment in which the curd is crushed by an agitator or the like;
(c) piercing treatment wherein a proper number of holes are formed, spaced a proper distance apart from each other, through the curd;
(d) scording treatment in which a proper number of linear channels are formed by the use of a cutter or the like.

These dividing treatments may be carried out at any stage, for example when the curd is maintained in a forming container, or after the curd is transferred into another container or after the curd is charged into a compressing container.

For the purpose of carrying out the pressing treatment effectively thereby obtaining finished pressed tofu having springiness, high compactness and good taste, the three dividing treatments i.e., a cutting, (c) piercing and (d) scoring is preferably employed because these three treatments make the exudation of water during the subsequent pressing process easier while maintaining the form of the curd as it is without much destruction of the curd texture.

According to the dividing process with syneresis, the dividing process is preferably effected so as to remove 4 to 46% of water contained in the curd whereby the exudation of water form the curd becomes easier and the dehydration efficiency during the pressing step (ii) is also enhanced and pressed tofu having excellent taste and texture can be obtained. It is expected to obtain even better tofu if the amount of water removed is in a range of 9 to 32%.

In the invention, the divided curd is then subjected to pressing treatment after charging it into a pressing container (or as it is, if the curd is divided in the pressing container) to reduce the water content thereof to at most 80%. The container used in this step may have any volume and form. However, preferably it is provided with a proper number of pores on its side and/or bottom walls in order to make the drainage, of water from the curd outside the container smoother during the pressing operation.

In the pressing operation, a pressing machine such as hydraulic pressing machine is preferably used and also the pressing operation is preferably carried out by increasing the pressure slowly from low to high, and thereby the breakdown of the curd texture can be prevented and the pressed tofu gains compactness and good taste and springy texture.

The pressing operation is desirably initiated from an initial pressure of about 0.04 to 0.6 kg/cm$^2$, preferably 0.2 to 0.4 kg/cm$^2$ and then gradually elevated up to a final presure of 0.80 to 3.2 kg/cm$^2$, preferably 1.2 to 2.0 kg/cm$^2$. Herein, and however, the pressure is expressed as a pressing load applied to a unit surface area of the divided curd to be pressed.

According to the process of this invention, the dehydration efficiency form the curd is extremely high because the curd to be pressed is previously divided.

Further, by reducing the water content of curd to at most 80% by the pressing process, it is possible to obtain good tofu having compact texture and good springiness, and if the water content is in a range of 80 to 55%, pressed tofu having better springiness can be obtained.

According to the process of this invention, the pressed curd is then charged into a heat-resistant container such as a container of synthetic resin and the container is sealed to subject it to heat treatment under, for example, high temperature and pressure conditions, such as hot water sterilization, retort treatment or the like. Such heat treatment is quite desirable for the reasons desired storability may be imparted to the togu, that the texture of the curd once divided in the foregoing dividing process may be reinteglated to form a more compact texture and that the springiness of the finished tofu is also improved. In particular, the heating treatment is effective in the case where the curd is divided according to the crushing treatment by the use of, for example an agitator or the degree of the division is very high i.e., the amount of water removed by syneresis is very high, because in such cases the finished tofu obtained after pressing operation lacks springiness and compactness and is not agreeable to the palate. Thus, the tofu of high quality can be provided.

As the preferred heat treatment, there may be mentioned, for example retort heating at an elevated pressure or heating in hot water (so-called hot water sterilization).

The heat treatment is carried out at a temperature of about 80° to 135° C. for about 5 to 60 minutes, preferably at a temperature of 90° to 105° C. for 10 to 20 minutes, and the taste and texture of the finished tofu can be substantially improved and quite excellent effects may be expected even if the curd is highly divided.

In the process of this invention, the heat-treated tofu is preferably cooled to room temperature to obtain the finished pressed tofu of this invention.

The present invention will now be illustrated more concretely by referring to the following nonlimitative examples together with comparative examples.

EXAMPLE 1 whole soaked were soaked in water and ground after the addition of water. The resulting "GO" was subjected to centrifugal separation to remove the lees of the soybeans and soybean milk having a solids cncentration of 11.2% was obtained. The soybean milk thus obtained was boiled for 1 to 2 minutes and 0.6% (relative to the weight of the soybean milk used) of G.D.L. was added to it and mixed. The mixture was left to stand for 15 minutes to form curd.

The curd was then charged into a pressing container provided with a proper number of holes on the side walls and covered with bleached cotton cloth. The curd charged into the container was diced (10 mm cubes) by vertically inserting a thin plate of stainless steel therein. The amount of water removed after the cutting treatment was 22%. The amount of water removed was determined as the amount of water removed from the curd when the divided curd was maintained on a 120-mesh sieve (opening 125 micron) for 15 minutes. The curd was then pressed by gradually increasing the pressure from 0.20 to 1.2 kg/cm$^2$ with a hydraulic pressing machine (pressing time was 39 minutes) and pressed tofu having a water content of 72.7% (sample A) was obtained.

EXAMPLE 2

Curd obtained by the same procedures as set forth in the Example 1 was crushed by an agitator (the amount of water removed after the crushing operation was 35%) and the crushed curd was charged into a pressing container provided with a proper number of holes on the side walls and covered with bleached cotton cloth and the pressure was gradually increased from 0.2 to 1.2 kg/cm$^2$ by a hydraulic pressing machine (pressing time was 25 minutes) to obtain pressed tofu having a water content of 71.1% (sample B).

COMPARATIVE EXAMPLE 1

Pressed tofu having a water content of 75.1% (sample C) was prepared according to the same procedures as described in the example 1 except for the omission of the dividing treatment (pressing time: 6 hours).

COMPARATIVE EXAMPLE 2

As per the example 2, the curd was crushed by an agitator (the amount of water removed after the dividing operation was 3.5%) and then the curd was pressed according to the procedures of the example 3 (pressing time: 3.5 hours) and pressed tofu having a water content of 74.3% (sample D) was obtained.

COMPARATIVE EXAMPLE 3

As per the example 2, curd was crushed by an agitator. At this stage, the crushed curd was in an almost paste-like condition and the amount of water removed was 47%.

Then, as per the example 1, the curd was charged into a container for pressing and was pressed by gradually increasing the pressure from 0.20 to 1.2 kg/cm$^2$ (pressing time was 17 minutes) to obtain pressed tofu having a water content of 70.9% (sample E).

COMPARATIVE EXAMPLE 4

As per the example 1, curd was subjected to dividing treatment and then the curd was pressed by gradually increasing the pressure from 0.2 to 0.8 kg/cm$^2$ (pressing time: 19 minutes) and pressed tofu containing 82.2% of water (sample F) was obtained.

The samples obtained above were examined for properties such as compactness (handness) and springiness by sensory tests. The results obtained are listed in the following Table 1.

TABLE 1

| Sample | The amount of Water Removed (%) | Pressing Time (min.) | Compactness | springiness |
|---|---|---|---|---|
| A | 22 | 39 | Very high hard | excellent palatable |
| B | 35 | 25 | Very high hard | excellent palatable |
| C | 2 | 6 (hours) | rather soft | less springy |
| D | 3.5 | 3.5 (hours) | rather soft | less springy |
| E | 47 | 17 | less compact soft | no springiness and crumbly |
| F | 22 | 19 | less compact soft | disagreeable to the plate. no springiness |

As is obvious from the foregoing results, the process according to the comparative examples 1 and 2 (products C and D), in which the dividing operation was omitted and the amount of water removed was less than the lower limit of the range of this invention, require the pressing operation over a very long period of time and, therefore there processes cannot be regarded as industrially suitable. Furthermore, it can be understood that the sample E in which the amount of water removed is larger than the upper limit according to this invention and the sample F in which the waste content after pressing operation is outside the range according to this invention lack that compactnes and springiness are regarded as the life and the soul of good tofu.

According to the processes of the present invention (the examples 1 and 2), the pressing operation can effectively be carried out without problems of the dehydration of the curd and the resulting pressed tofu (A and B) is completely acceptable with respect to quality.

EXAMPLE 3

The pressed curd obtained by the same procedures as set forth in the example 1 was transferred to a heat-resistant container of a synthetic resin, the container was vacuum sealed by and then heated, using retort treatment, at 121° C. for 20 minutes and cooled to obtain the pressed tofu (sample G).

EXAMPLE 4

The pressed curd obtained by the same procedures as set forth in the example 2 was charged into a heat-resistand container of a synthetic resin and the container was vacuum sealed. The vacuum-packed curd was heated in hot water of 100° C. for 15 minutes and cooled to obtain the pressed tofu (sample H).

The samples thus obtained were examined for properties such as compactness (hardness) and springiness by sensory tests. The results obtained are listed in the following Table 2.

TABLE 2

| Sample | The amount of water removed (%) | Pressing Time (min.) | Compactions | springiness |
|---|---|---|---|---|
| G | 22 | 39 | extremely compact and suitably hard | excellent, palatabe |
| H | 35 | 25 | extremely compact and suitably hard | excellent, palatable |

Sample G or H that was obtained by the heat treatment of sample A or B has better characters on both compactness and springiness, further each of which has excellent palatability and long term storability.

What is claimed is:

1. A process for preparing pressed tofu which comprises forming curd by adding a coagulant to soybean milk or an aqueous solution of isolated soybean protein wherein the water content of curd thus formed is between 80 and 92% by weight; subjecting the curd to a dividing treatment that is accompanied by syneresis so that the amount of water removed from the curd due to syneresis falls within a range of 4 to 46% by weight of water in the curd, charging the divided curd into a pressing container; then pressing the divided curd to reduce the water content to at most 80%, said pressing treatment being carried out with a pressing machine by gradually increasing the pressure from an initial pressure of 0.04–0.6 kg/cm$^2$ to a final pressure of 0.8–3.2 kg/cm$^2$.

2. A process for preparing pressed tofu as set forth in the claim 1 wherein the dividing treatment is selected from the group consisting of cutting, crushing, piercing and scoring.

3. A process as set forth in claim 2 in which the dividing treatment is selected from the group consisting of cutting, piercing and scoring.

4. A process as set forth in claim 1 wherein the amount of water removed is 9 to 32%.

5. A process as set forth in claim 1 wherein the solid concentration of soybean milk is 8 to 20% by weight based on the total weight of soybean milk.

6. A process as set forth in claim 1 in which the water content of the pressed curd is 80 to 55%.

7. A process as set forth in claim 1 wherein the pressing treatment is carried out by gradually increasing the pressure from an initial pressure of 0.20 to 0.40 kg/cm$^2$ to a final pressure of 1.2 to 2.0 kg/cm$^2$.

8. A process as set forth in claim 1 in which the coagulant is δ-gluconic lactone and the amount thereof is 0.30 to 0.65%.

9. A process as set forth in claim 1 wherein the coagulant is calcium sulfate and the amount thereof is 0.25 to 0.65%.

10. A process for preparing pressed tofu which comprises forming curd by adding a coagulant to soybean milk or an aqueous solution of separated soybean protein wherein the water content of curd thus formed is between 80 and 92% by weight; subjecting the curd to a dividing treatment that is accompanied by syneresis so that the amount of water removed from the curd due to syneresis falls within a range of 4 to 46% by weight of water in the curd, charging the divided curd into a pressing container; then pressing the divided curd to reduce the water content to at most 80%, said pressing treatment being carried out with a pressing machine by gradually increasing the pressure from an initial pressure of 0.04–0.6 kg/cm$^2$ to a final pressure of 0.8–3.2 kg/cm$^2$; thereafter taking the curd out of the pressing container and heating the curd at a temperature of about 80° to 130° C. for about 5 to 60 minutes after charging it into a packaging container and sealing the container.

11. Pressed tofu prepared according to a process as set forth in claim 1.

12. A process as set forth in claim 10 wherein the pressing treatment is carried out by gradually increasing the pressure from an initial pressure of 0.2–0.4 kg/cm$^2$ to a final pressure of 1.2–2.0 kg/cm$^2$.

13. Pressed tofu prepared according to a process as set forth in claim 10.

* * * * *